(12) United States Patent
Kim et al.

(10) Patent No.: US 9,810,801 B2
(45) Date of Patent: Nov. 7, 2017

(54) METHOD FOR SWELL EFFECT AND MIS-TIE CORRECTION IN HIGH-RESOLUTION SEISMIC DATA USING MULTI-BEAM ECHO SOUNDER DATA

(71) Applicant: KOREA INSTITUTE OF GEOSCIENCE AND MINERAL RESOURCES, Daejeon (KR)

(72) Inventors: Young-Jun Kim, Daejeon (KR); Nam Hyung Koo, Daejeon (KR); Won-Sik Kim, Daejeon (KR); Jong-Hwa Chun, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 70 days.

(21) Appl. No.: 14/963,929

(22) Filed: Dec. 9, 2015

(65) Prior Publication Data

US 2016/0299244 A1    Oct. 13, 2016

(30) Foreign Application Priority Data

Apr. 7, 2015    (KR) .................. 10-2015-0048933

(51) Int. Cl.
```
G01V 1/36      (2006.01)
G01V 1/38      (2006.01)
G01V 1/28      (2006.01)
```

(52) U.S. Cl.
CPC ............... *G01V 1/364* (2013.01); *G01V 1/28* (2013.01); *G01V 1/362* (2013.01); *G01V 1/3808* (2013.01); *G01V 1/38* (2013.01); *G01V 2210/532* (2013.01); *G01V 2210/59* (2013.01)

(58) Field of Classification Search
CPC ...... G01V 1/364; G01V 1/3808; G01V 1/362; G01V 1/28; G01V 2210/59; G01V 1/38; G01V 2210/532
USPC .......................................................... 367/21
See application file for complete search history.

(56) References Cited

FOREIGN PATENT DOCUMENTS

KR    10-2012-0138702    12/2012

OTHER PUBLICATIONS

Gutowski et al., "Fast static correction methods for high-frequency multichannel marine seismic reflection data: A high-resolution seismic study of channel-levee systems on the Bengal Fan," Marine Geophysical Researches 23: 57-75, 2002.*

\* cited by examiner

*Primary Examiner* — Daniel L Murphy
(74) *Attorney, Agent, or Firm* — Hauptman Ham, LLP

(57) ABSTRACT

Provided is a method for swell effect and mis-tie correction in high-resolution marine seismic data using multi-beam echo sounder data, and more particularly, a method for swell effect and mis-tie correction in high-resolution marine seismic data using multi-beam echo sounder data capable of acquiring the high-resolution marine seismic data having the swell effect and the mis-tie effectively corrected by using the multi-beam echo sounder data including water depth data of a sea-bottom having high precision.

6 Claims, 3 Drawing Sheets

METHOD FOR SWELL EFFECT AND MIS-TIE CORRECTION IN HIGH-RESOLUTION SEISMIC DATA USING MULTI-BEAM ECHO SOUNDER DATA

CROSS-REFERENCE TO RELATED APPLICATIONS

This application claims priority under 35 U.S.C. §119 to Korean Patent Application No. 10-2015-0048933, filed on Apr. 7, 2015, in the Korean Intellectual Property Office, the disclosure of which is incorporated herein by reference in its entirety.

TECHNICAL FIELD

The following disclosure relates to a method for swell effect and mis-tie correction in high-resolution seismic data using multi-beam echo sounder data, and more particularly, to a method for swell effect and mis-tie correction in high-resolution marine seismic data using multi-beam echo sounder data capable of acquiring the high-resolution marine seismic data having the swell effect and the mis-tie at an intersection point effectively corrected by using the multi-beam echo sounder data including water depth data of a sea-bottom having high precision.

BACKGROUND

Seismic exploration for exploring submarine natural resources such as petroleum, natural gas, gas hydrate, or the like, or bedrock investigation for marine construction such as undersea pipeline and cable burying, undersea tunnel, undersea storage equipment, bridge, or the like, has been performed. High-resolution marine seismic survey for the purpose of engineering such as marine engineering and construction works of the submarine pipeline, the cable burying, the submarine tunnel, the submarine storage equipment, the bridge, etc., is to understand a shallow geological structure in which a water depth is shallow.

The high-resolution marine seismic exploration needs precise exploration so that the vertical resolution of exploration data is about 1 m. However, a swell or a wave on the sea which always happens by an ocean current, a tidal current, and a wind affects the seismic data and thus it is difficult to precisely figure out a sub-bottom structure on the seismic sections. The swell effect on the seismic sections is represented by sea-bottom trembling in a saw-toothed shape. This phenomenon affects the whole seismic sections to reduce continuity of the seismic events related to the sub-bottom structures.

As a general data acquisition system of high-resolution marine seismic survey, seismic source generators such as a small air-gun, a sparker, and a boomer, and a receiver of a multi-channel streamer of a single channel or 8 channels and 24 channels or less, etc., have been mainly used. Alternatively, the exploration may also be performed by using a chirp sub-bottom profiler (hereinafter, referred to as 'chirp SBP'). These explorations are to understand the shallow geological structure and therefore use a relatively higher frequency to be able to acquire seismic data having a low penetration depth but high resolution. When the seismic source is the small air-gun, frequency bands correspond to 100 to 350 Hz, when the seismic source is the sparker, frequency bands correspond to 600 to 900 Hz, when the seismic source is the boomer, frequency bands correspond to 1000 to 2000 Hz, and when the seismic source is the chirp SBP, frequency bands correspond to 2000 to 7000 Hz.

Meanwhile, a vertical resolution may be represented by the following Equation 1.

$$R_V = \frac{1}{4}\lambda = \frac{v}{4f} \quad \text{[Equation 1]}$$

In the above Equation 1, $\lambda$ represents a wavelength, v represents a medium velocity, and f represents a frequency. For example, when a velocity of marine shallow sedimentary layer is 1500 m/s, the vertical resolution of the air-gun is about 1.07 to 3.75 m, the vertical resolution of the sparker is about 0.42 to 0.63 m, the vertical resolution of the boomer is about 0.19 to 0.38 m, and the vertical resolution of the chirp SBP is about 0.054 to 0.188 m.

Generally, in the case of the high-resolution marine seismic survey, the seismic survey is performed by equidistance shooting, not equidistance shooting and a time interval is determined depending on a water depth of the survey area and power of the seismic source. In the exploration using the sparker, the boomer, and the chirp SBP, the shot interval is made every 1 second at a water depth of 100 m or less. Converting it into a distance, the shooting is made once every about 2.57 m when a velocity of a survey vessel is about 5 knots. A vertical axis of the seismic section is represented by two-way travel time and a horizontal axis is represented by the number of shots. When the exploration is made under the marine environments that the swell having a size of 1 to 2 m is present, the survey is affected by the swell effect every 2.57 m at the horizontal axis and at the same time the travel time at the vertical axis moves up or down every 0.676 to 1.351 ms (seawater velocity=1,480 m/s).

As a frequency of the seismic source is getting higher, the vertical resolution is increased but the seismic source is more sensitive to the effect of swell and wave. Further, under conditions of a shallow marine, the shot interval becomes narrower. For this reason, even in this case, the effect of the swell and the wave is recorded in the seismic data. Therefore, the high-resolution seismic data may be more affected by the swell and the wave.

For example, if the marine seismic survey is performed on four main survey lines of south-north direction and two auxiliary survey lines of east-west direction, a total of eight intersection points are generated. Since each intersection point passes through the same point, the two-way travel time needs to be same. However, the wind, tidal current, and ocean current directions for the same survey line are changed on the sea depending on a south-north direction or a north-south direction, such that the difference in the two-way travel time may occur. Therefore, the difference in the two-way travel time occurs every intersection point. This phenomenon causes an error upon manufacturing an isopach map, a time structure map, etc., when the number of intersection points is increased. Further, as the frequency of the seismic source is getting higher, the wavelength becomes shorter. Therefore, the intersection point error more clearly appears in the high-resolution seismic data.

Therefore, to acquire the high-resolution seismic data, the correction method with more improved accuracy is required.

RELATED ART DOCUMENT

Patent Document

Korean Patent Laid-Open Publication No. 2012-0138702 (Published on Dec. 26, 2012)

SUMMARY

An embodiment of the present invention is directed to providing a method for swell effect and mis-tie correction in high-resolution marine seismic data with very excellent accuracy and reliability of the seismic data after the correction by using the multi-beam echo sounder data at the time of correcting the swell effect and the mis-tie at the intersection point of the high-resolution marine seismic data.

Another embodiment of the present invention is directed to providing a recording medium stored with programs for implementing the correction method and a computer program stored in a medium for implementing the same.

In one general aspect, a method for swell effect and mis-tie correction of marine seismic data using multi-beam echo sounder data measured by a multi-beam echo sounder includes: a) receiving the multi-beam echo sounder data; b) extracting water depth values corresponding to the same positions (for example, latitude and longitude coordinate points) as shot points at the seismic data in the multi-beam echo sounder data; c) correcting the swell effect and the mis-tie at the coordinate points of the seismic data by reflecting the water depth values; and d) deriving the marine seismic data at which the swell effect and the mis-tie are corrected by performing the steps b and c on all the coordinate points at the seismic data.

The step c may include: c-1) calculating a first sea-bottom two-way travel time to which the water depth value is reflected by converting the water depth value into a two-way travel time using a vertical sound velocity of the sea water measured upon acquiring the multi-beam echo sounder data; c-2) extracting a second sea-bottom two-way travel time corresponding to the coordinate point in the seismic data; and c-3) correcting the swell effect and the mis-tie at the coordinate point of the seismic data by comparing the first sea-bottom two-way travel time with the second sea-bottom two-way travel time.

The step c-3 may include: c-3-1) calculating a difference value between the first sea-bottom two-way travel time to which the water depth value is reflected and the second sea-bottom two-way travel time; and c-3-2) correcting the swell effect and the mis-tie by applying the difference value to the entire two-way travel time at the coordinate point of the seismic data.

In another general aspect, a recording member is a computer readable recording medium recorded with programs to implement the correction method.

In still another general aspect, a computer program is a computer readable recording medium recorded with programs to implement the method.

Other features and aspects will be apparent from the following detailed description, the drawings, and the claims.

DETAILED DESCRIPTION OF EMBODIMENTS

An exemplary embodiment of the present invention proposes a new method for correcting wave and swell effects generated by a wind, an ocean current, a tidal current, etc., and vertical and horizontal mis-ties at the intersection point in seismic data recorded by high-resolution marine seismic survey.

First, prior to describing the correction method according to the exemplary embodiment of the present invention, the existing correction method will be briefly described.

The existing method for correcting a swell effect may be largely classified into extracting a sea-bottom travel time and removing a swell effect. In the extracting of the sea-bottom travel time, the sea-bottom travel time is extracted by using a correlation method using a principle of performing a correlation between a seismic source signal and a sea-bottom reflection signal to determine a place where the correlation is maximum as the sea-bottom, a maximum amplitude method using energy of the sea-bottom reflection signal, an image color extraction method using colors of a sub-bottom section, etc. The method for removing a swell effect uses an adjacent water depth average method for extracting the sea-bottom travel time and then averaging a travel time of adjacent traces, a high frequency removal filtering method for obtaining spectra from travel time extraction data to remove a high frequency band over a predetermined wave number which looks like the swell effect in a frequency domain, etc.

However, the method for removing a swell effect may distort actual topography. For example, in the case of the seismic data acquired from an area with severe indentations like a ripplemark shape as a mark of an undulation formed on a surface of a sediment in the sea-bottom due to a motion of wind or water, the actual submarine topography is deformed due to the removal of the swell effect to derive the seismic sections without the ripplemark shape and with the flat sea-bottom.

Further, the existing method for mis-tie correction performs the correction by adding and subtracting the entire two-way travel time at the corresponding coordinate points based on one survey line when there is only one intersection point. However, when at least two intersection points are generated at one survey line, if the two-way travel time is partially added and subtracted by a difference based on the intersection points, the seismic sections will be distorted. When the correction is performed based on the intersection points for the main survey lines, there is a problem in that there may also be the effect of the survey line in an isopach map, a time structure map, etc., which are manufactured later.

The correction method according to one exemplary embodiment of the present invention may solve all the above-mentioned problems according to the existing method by using multi-beam echo sounder data which are data measured by an multi-beam echo sounder upon the correction.

Figure 1:
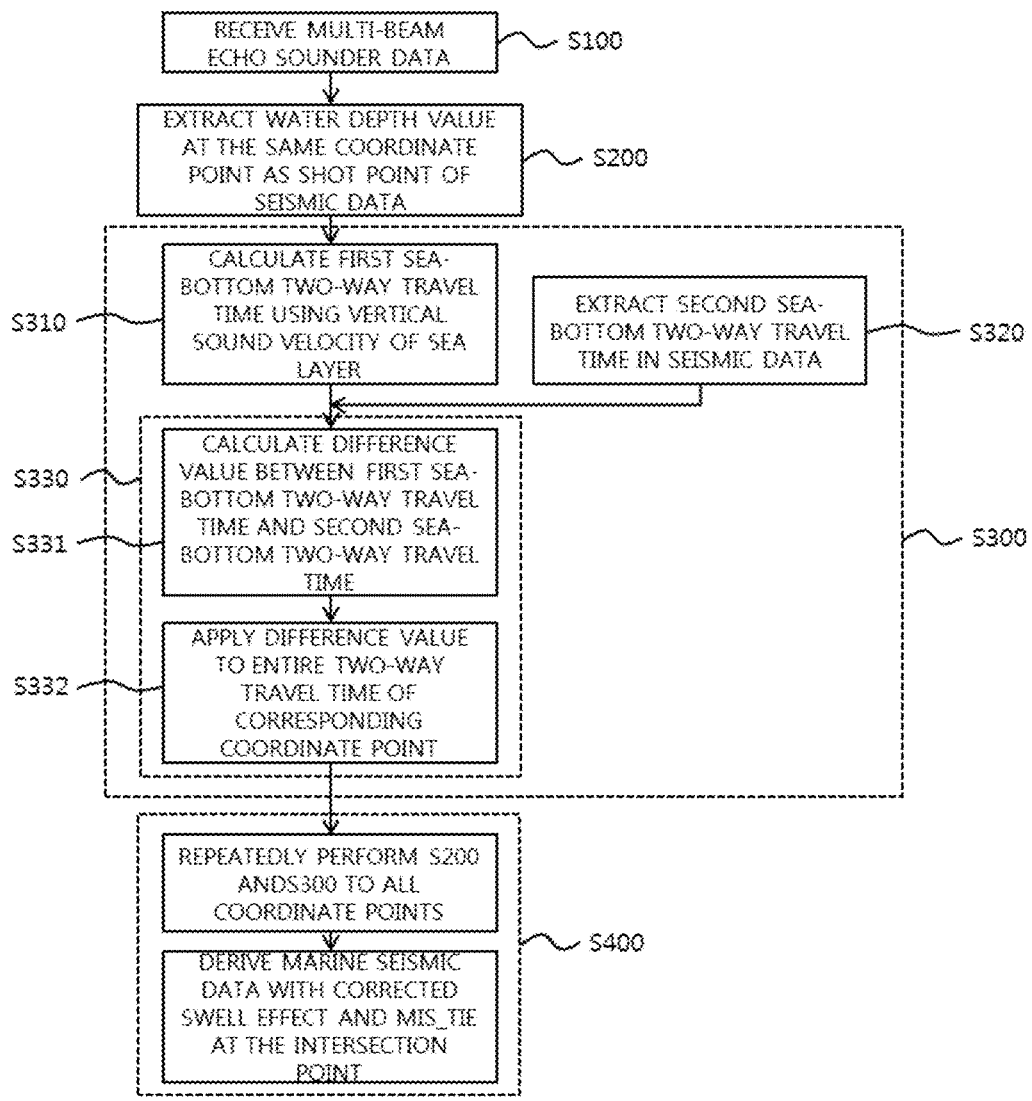
FIG. 1 is a flow chart of a correction method according to an exemplary embodiment of the present invention.

FIG. 1 is a flow chart of a correction method according to an exemplary embodiment of the present invention. Hereinafter, a technical spirit of the present invention will be described in more detail with reference to FIG. 1.

However, the accompanying drawings are only examples shown in order to describe the technical idea of the present invention in more detail. Therefore, the technical idea of the present invention is not limited to shapes of the accompanying drawings.

As illustrated in FIG. 1, the correction method according to the exemplary embodiment of the present invention may largely include steps a to d.

First, the step a receives computerized multi-beam echo sounder data (S100) and the step b extracts water depth values corresponding to the same positions(latitude/longitude coordinate points) as shot points at the seismic data in the multi-beam echo sounder data (S200). Further, step c corrects a swell effect and an mis-tie at the coordinate point of the seismic data by reflecting the water depth values (S300) and step d derives the marine seismic data with the corrected swell effect and mis-tie by repeatedly performing the steps b and c on all the coordinate points at the seismic data (S400).

In more detail, in the step a of receiving the multi-beam echo sounder data, the multi-beam echo sounder data are data obtained by computerizing the data measured by the multi-beam sounder. The multi-beam echo sounder means a sounding machine for simultaneously measuring the entire horizontal swath of the sea-bottom which is around five times as large as a water depth by emitting at least 200 echo beams of a frequency band over approximately 30 kHz while a ship moves and again receiving the emitted echo beams. Since the multi-beam echo sounder is mainly used to prepare a submarine topographic map and may adjust a sounding shape at an equal distance or an equal angle based on a central axis of a survey vessel, the multi-beam echo sounder may perform a wide width or precision exploration according to research purposes. When the multi-beam echo sounder data is acquired on the scene, 'pitch', 'raw', 'heave', etc., of the survey vessel which are received by a motion sensor are measured and corrected. Further, to correct vertical sound velocity variations at each area, a vertical sound velocity for the entire sea water of the survey area is measured and to correct a refraction of beam formed on a surface layer, a sound velocity of surface seawater is measured in real time by a surface sound velocity sensor. Further, a tidal correction is performed over time. When error data are removed by using multi-beam echo sounder data processing such as HIPS and SIPS, the multi-beam echo sounder data which are the final water depth data used in the topographic map is calculated.

Meanwhile, the marine seismic data to be corrected are data acquired by using a high-resolution seismic data. Here, the high-resolution marine seismic data is to understand the shallow sub-bottom structure and therefore uses a relatively higher frequency than that of a typical seismic data to be able to acquire the high-resolution seismic data having a low penetration depth but high resolution. That is, the multi-beam echo sounder is an apparatus for using a relatively higher frequency and emitting a multi beam once to simultaneously measure the entire sea-bottom within a predetermined range and the high-resolution seismic section may use the relatively lower frequency to precisely understand the shallow sub-bottom structure. In this case, the high-resolution marine seismic data requires the more precise resolution than 1 m, but there is a problem in that the swell and intersection point errors due to a wave or a wind on the sea may greatly reduce the resolution of data.

Therefore, in the step a, the multi-beam echo sounder data are received and then in the step b, the water depth values corresponding to the same positions(coordinate points) as the shot points at the seismic data before the correction are extracted from the multi-beam echo sounder data received in the step a.

Next, the step c of correcting the swell effect and the mis-tie in the seismic data is performed by reflecting the water depth values for the corresponding coordinate points extracted in the step b.

In this case, as illustrated, the step c may be divided into steps c-1 to c-3. First, the step c-1 is a step of converting the water depth value (unit distance: m) into the two-way travel time (unit time: ms) by using the vertical sound velocity of the sea water measured upon acquiring the multi-beam echo sounder data (S310). In this step, a first sea-bottom two-way travel time to which the water depth value is reflected is calculated. That is, the first sea-bottom two-way travel time is converted from the multi-beam echo sounder data and is the two-way travel time to which the more accurate water depth value is reflected.

Next, in the step c-2, a second sea-bottom two-way travel time corresponding to the same coordinate point is extracted in the seismic data (S320) and in the final step c-3, the swell effect and the mis-tie at the coordinate point of the seismic data are corrected by comparing the first sea-bottom two-way travel time with the second sea-bottom two-way travel time (S330). Describing in more detail, the step c-3 is performed by calculating a difference value between the first sea-bottom two-way travel time reflecting the water depth value and the second sea-bottom two-way travel time (S331) and adding and subtracting the calculated difference value at the entire two-way travel time at the coordinate point of the seismic data (S332). For example, if the first sea-bottom two-way travel time at any one coordinate point is 70 ms and the second sea-bottom two-way travel time is 80 ms, the difference value between the two two-way travel times is +10 ms, which is added to all the two-way travel times at the corresponding coordinate points of the seismic data before the correction.

Finally, if the steps b and c are repeatedly performed on all the coordinate points at the seismic data in the step d, the seismic data after the correction of the swell effect to which the water depth value is finally reflected is derived. In this case, even though the number of survey lines is many and thus the intersection point error is present, the water depth values of the same positions(coordinate point) extracted from the multi-beam echo sounder data are applied and thus the mis-ties are also corrected.

Hereinafter, chirp SBP sections after and before the correction method according to the exemplary embodiment of the present invention is applied are compared with reference to FIGS. 2 and 3.

Figure 2:
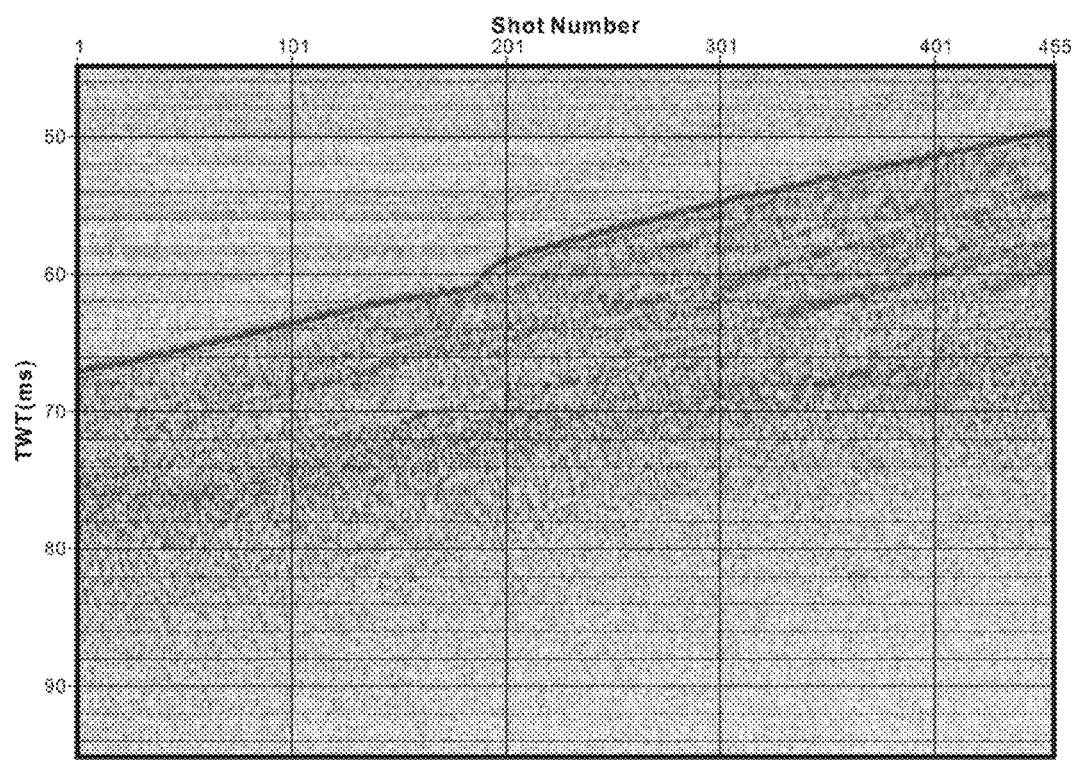
FIG. 2 is a chirp SBP section before correction.
Figure 3:
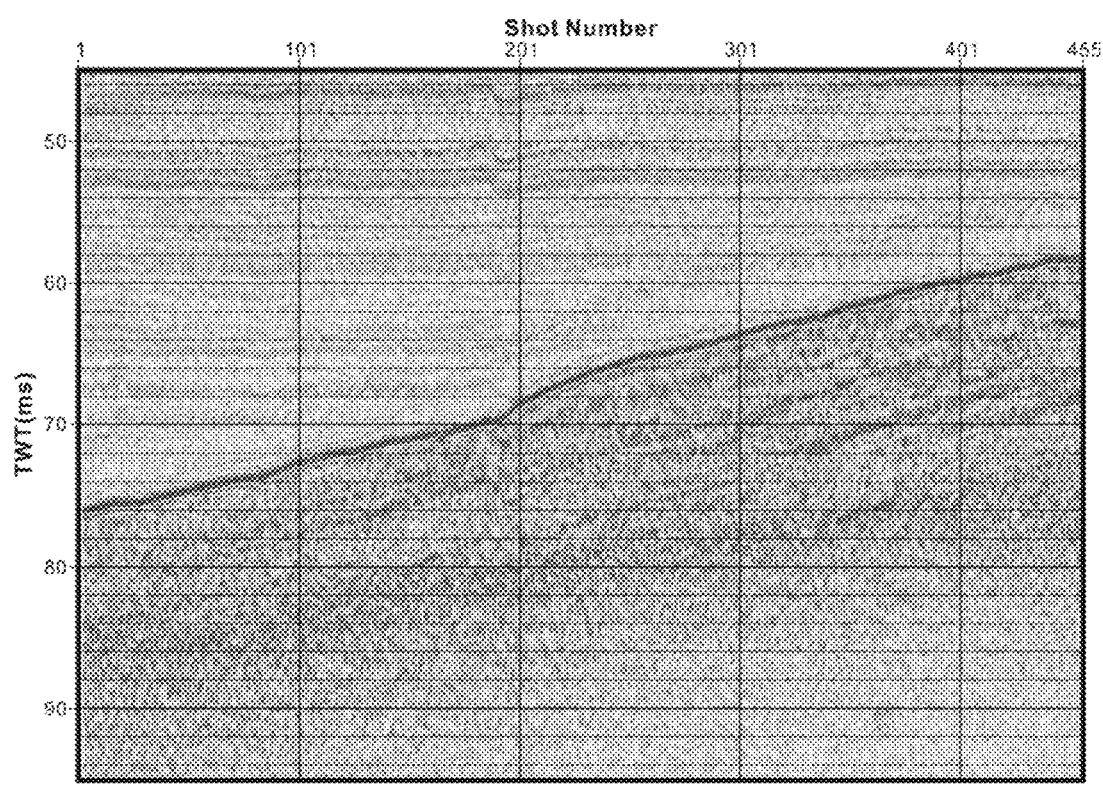
FIG. 3 is a chirp SBP section after the correction by applying the correction method according to the exemplary embodiment of the present invention.

FIG. 2 is a chirp SBP section before the correction acquired by a chirp SBP raw material acquisition system in a mud-belt area near the southeastern East Sea coast of Jung-ja harbor, Ulsan and FIG. 3 is a chirp SBP section after the correction by applying the correction method according to the exemplary embodiment of the present invention using the water depth value acquired by Seabat 8124 from RESON Co., which is the multi-beam echo sounder. In this case, a vertical axis of the seismic section is represented by two-way travel time and a horizontal axis is represented by the number of shots.

As illustrated in FIG. 2, it may be appreciated from the chirp SBP section before the correction that events that the sea-bottom is represented like a sawtooth due to the swell effect are generated.

The correction method according to the exemplary embodiment of the present invention is applied to the chirp SBP section illustrated in FIG. 2 to derive the chirp SBP section illustrated in FIG. 3. It may be appreciated from the chirp SBP section illustrated in FIG. that the water depth values of the multi-beam echo sounder data to which the vertical sound velocity of the sea water is applied are used and therefore the difference in the two-way travel time occurs. Further, it may be appreciated that the events appearing like the sawtooth of FIG. 2 are completely removed. That is, it may be appreciated that the swell effect is completely corrected and the actual water depth value is reflected.

As a result, the related art has the problem in that the correction reliability of the swell effect and the mis-ties on the seismic data requiring the precise resolution to understand the sub-bottom structure may be reduced, but the correction method according to the exemplary embodiment of the present invention may apply the accurate water depth values when using the multi-beam echo sounder data to greatly improve the quality of the seismic data after the correction.

That is, the correction method according to the exemplary embodiment of the present invention may simultaneously correct both of the swell effect and the intersection point error despite the relatively simple correction process.

Meanwhile, the method for correcting a swell effect and an mis-tie at the intersection point of marine seismic data using the multi-beam echo sounder data according to the exemplary embodiment of the present invention described with reference to FIG. 1 may also be implemented in a type of a recording medium including instructions executable by a computer such as a program module executed by the computer. A computer readable medium may be an available medium which may be accessed by the computer.

Further, the correction method according to the exemplary embodiment of the present invention may also be implemented in computer programs (or computer program products) including the instructions executable by the computer. Therefore, the correction method according to the exemplary embodiment of the present invention may be implemented by allowing the computing apparatus to execute the computer programs as described above.

The related art has the problem in that the correction reliability of the swell effect and the mis-ties on the seismic data requiring the precise resolution to understand the sub-bottom structure may be reduced, but the correction method according to the exemplary embodiment of the present invention may apply the accurate water depth values when using the multi-beam echo sounder data to greatly improve the quality of the seismic data after the correction.

That is, the correction method according to the exemplary embodiment of the present invention may simultaneously correct both of the swell effect and the intersection point error despite the relatively simple correction process.

The foregoing description of the present invention is only an example and those skilled in the art will appreciate that the present invention may be easily changed to other detailed forms, without departing from technical ideas or essential features of the present invention. Therefore, it should be understood that the above-mentioned embodiments are not restrictive but are exemplary in all aspects.

It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A method for correcting a swell effect and a mis-tie at the intersection point of marine seismic data using multi-beam echo sounder data measured by a multi-beam sounder, the method comprising:
    receiving the multi-beam echo sounder data;
    extracting water depth values corresponding to positions having latitude and longitude coordinate points same as shot points at the marine seismic data in the multi-beam echo sounder data;
    correcting the swell effect and the mis-tie at the coordinate points of the marine seismic data by reflecting the water depth values; and
    deriving the marine seismic data at which the swell effect and the mis-tie are corrected by performing the extracting and the correcting on all coordinate points at the marine seismic data.

2. The method of claim 1, wherein the correcting the swell effect and the mis-tie comprises:
    calculating a first sea-bottom two-way travel time to which the water depth value is reflected by converting the water depth value into a two-way travel time using a vertical sound velocity of a sea water measured upon acquiring the multi-beam echo sounder data;
    extracting a second sea-bottom two-way travel time corresponding to a coordinate point in the marine seismic data; and
    correcting the swell effect and the mis-tie at the coordinate point of the marine seismic data by comparing the first sea-bottom two-way travel time with the second sea-bottom two-way travel time.

3. The method of claim 2, wherein the correcting the swell effect and the mis-tie at the coordinate point of the marine seismic data by comparing the first sea-bottom two-way travel time with the second sea-bottom two-way travel time comprises:
    calculating a difference value between the first sea-bottom two-way travel time to which the water depth value is reflected and the second sea-bottom two-way travel time; and
    correcting the swell effect and the mis-tie by applying the difference value to the entire two-way travel time at the coordinate point of the marine seismic data.

4. A non-transitory computer readable recording medium storing a program for implementing a method for correcting a swell effect and a mis-tie at the intersection point of marine seismic data using multi-beam echo sounder data measured by a multi-beam sounder, the method comprising:
    receiving the multi-beam echo sounder data;
    extracting water depth values corresponding to positions having latitude and longitude coordinate points same as shot points at the marine seismic data in the multi-beam echo sounder data:
    correcting the swell effect and the mis-tie at the coordinate points of the marine seismic data by reflecting the water depth values; and
    deriving the marine seismic data at which the swell effect and the mis-tie are corrected by performing the extracting and the correcting on all coordinate points at the marine seismic data.

5. The non-transitory computer readable recording medium of claim 4, wherein the correcting the swell effect and the mis-tie comprises:
    calculating a first sea-bottom two-way travel time to which the water depth value is reflected by converting the water depth value into a two-way travel time using a vertical sound velocity of a sea water measured upon acquiring the multi-beam echo sounder data;

extracting a second sea-bottom two-way travel time corresponding to a coordinate point in the marine seismic data; and correcting the swell effect and the mis-tie at the coordinate point of the marine seismic data by comparing the first sea-bottom two-way travel time with the second sea-bottom two-way travel time.

6. The non-transitory computer readable recording medium of claim 5, wherein the correcting the swell effect and the mis-tie at the coordinate point of the marine seismic data by comparing the first sea-bottom two-way travel time with the second sea-bottom two-way travel time comprises:

calculating a difference value between the first sea-bottom two-way travel time to which the water depth value is reflected and the second sea-bottom two-way travel time; and correcting the swell effect and the mis-tie by applying the difference value to the entire two-way travel time at the coordinate point of the marine seismic data.

\* \* \* \* \*